United States Patent
Noro

(10) Patent No.: US 9,529,404 B2
(45) Date of Patent: Dec. 27, 2016

(54) INFORMATION PROCESSING APPARATUS AND METHOD OF CONTROLLING INFORMATION PROCESSING APPARATUS

(71) Applicant: FUJITSU LIMITED, Kawasaki-shi, Kanagawa (JP)

(72) Inventor: Masaaki Noro, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 308 days.

(21) Appl. No.: 14/188,128

(22) Filed: Feb. 24, 2014

(65) Prior Publication Data

US 2014/0289545 A1 Sep. 25, 2014

(30) Foreign Application Priority Data

Mar. 21, 2013 (JP) .................................. 2013-058359

(51) Int. Cl.
*G06F 1/32* (2006.01)

(52) U.S. Cl.
CPC ............... *G06F 1/3212* (2013.01); *G06F 1/32* (2013.01); *G06F 1/324* (2013.01); *G06F 1/3218* (2013.01); *Y02B 60/1217* (2013.01); *Y02B 60/1292* (2013.01)

(58) Field of Classification Search
CPC ............... G06F 1/32; G06F 1/26; G06F 1/28; G06F 1/00
USPC ............... 713/300, 310, 320, 321, 322, 323, 324, 713/330, 340, 375
See application file for complete search history.

(56) References Cited

U.S. PATENT DOCUMENTS

| 2006/0227771 | A1* | 10/2006 | Raghunath | G06F 9/5038 370/389 |
| 2008/0077815 | A1* | 3/2008 | Kanakogi | G06F 1/3203 713/322 |
| 2009/0119490 | A1* | 5/2009 | Oh | G06F 9/30065 712/214 |
| 2009/0292935 | A1* | 11/2009 | Hallnor | G06F 1/3203 713/323 |
| 2010/0037080 | A1 | 2/2010 | Kawashima et al. | |

FOREIGN PATENT DOCUMENTS

| JP | 05-289769 | 11/1993 |
| JP | 2000-222061 | 8/2000 |
| JP | 2002-366252 | 12/2002 |
| JP | 2010-039791 | 2/2010 |

* cited by examiner

*Primary Examiner* — Phil Nguyen
*Assistant Examiner* — Keshab Pandey
(74) *Attorney, Agent, or Firm* — Oblon, McClelland, Maier & Neustadt, L.L.P.

(57) ABSTRACT

An information processing apparatus includes a memory, and a processor coupled to the memory and configured to set an operating frequency of the processor at a first value in response to an occurrence of a first event, when a second event occurs after the occurrence of the first event, to determine whether the second event occurs within a predetermined period after the occurrence of the first event, and when the second event occurs after the predetermined period, set the operating frequency at a second value, and when the second event occurs within the predetermined period, set the operating frequency at a third value higher than the second value.

20 Claims, 9 Drawing Sheets

FIG. 4

TERMINAL STATE PARAMETER TABLE T

| TERMINAL STATE | SCREEN | APPLICATION | ... | CONTROL PARAMETER |
|---|---|---|---|---|
| 1 | ON | E-MAIL | ... | LOWER LIMIT : 300MHz |
| 2 | OFF | E-MAIL | ... | LOWER LIMIT : 100MHz |
| ... | ... | ... | ... | ... |

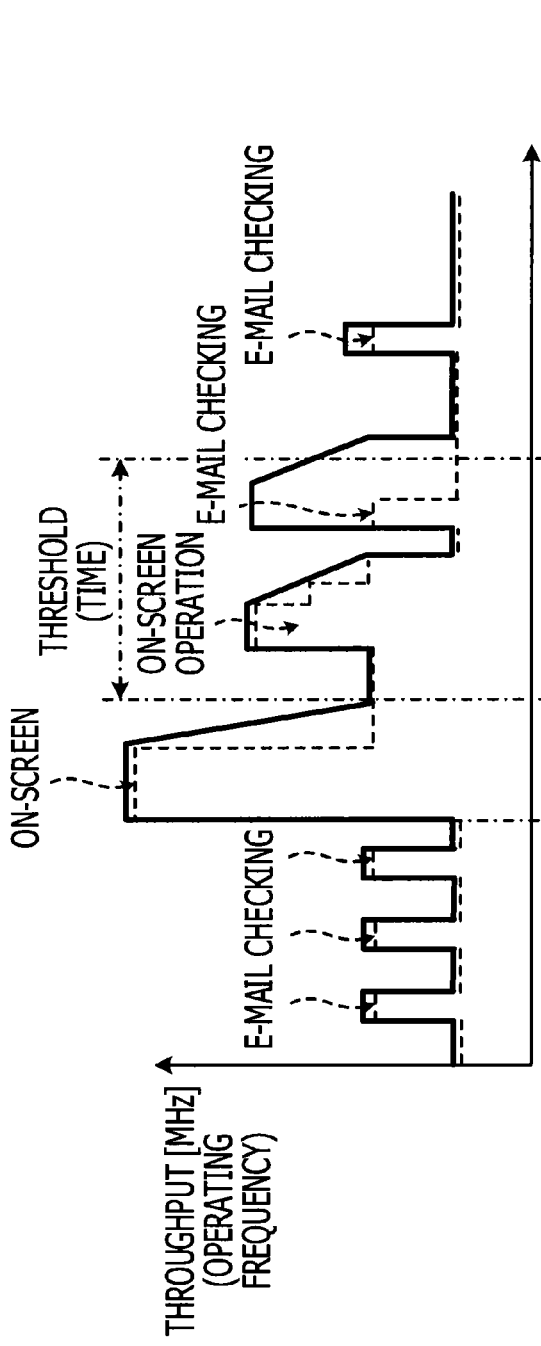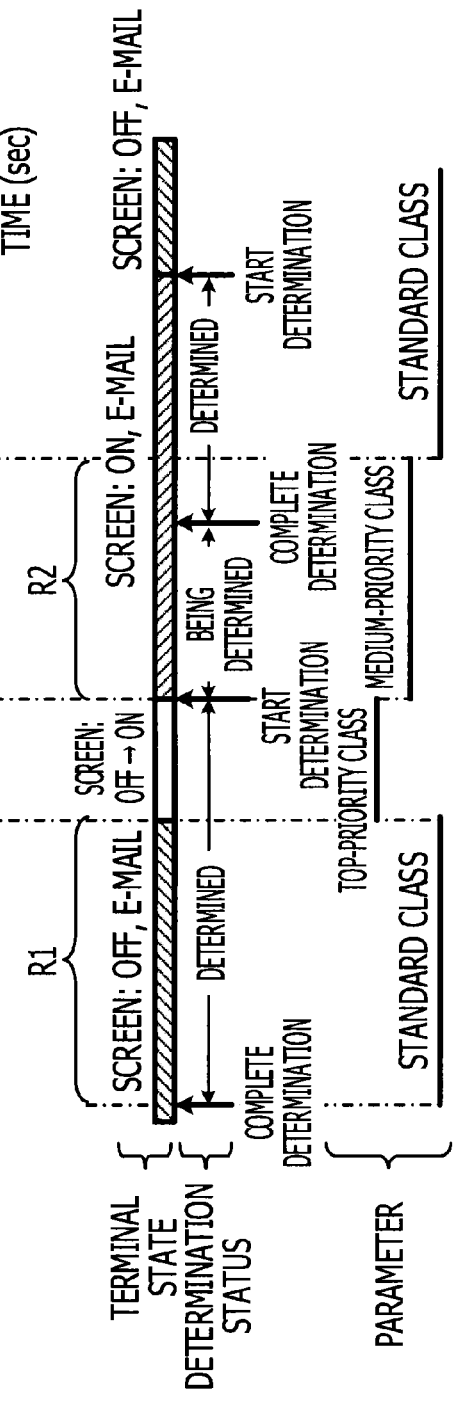
FIG. 6A
FIG. 6B

INFORMATION PROCESSING APPARATUS AND METHOD OF CONTROLLING INFORMATION PROCESSING APPARATUS

CROSS-REFERENCE TO RELATED APPLICATION

This application is based upon and claims the benefit of priority of the prior Japanese Patent Application No. 2013-058359, filed on Mar. 21, 2013, the entire contents of which are incorporated herein by reference.

FIELD

The embodiments discussed herein are related to an information processing apparatus and a method of controlling the information processing apparatus.

BACKGROUND

Portable information terminals such as smartphones, as well as typical operating systems (OSs) for desktop personal computers (PCs), allow users to freely download and install a wide variety of applications. It is therefore difficult to know, in advance, the operating frequency of a central processing unit (CPU) desired by every application. Likewise, it is difficult for application developers to know to what extent the CPU performance is used in each of a wide variety of portable information terminals. This makes it impossible for the application developers to determine the operating frequency of the CPU in a portable information terminal based on the operating frequency of the CPU used for every application.

Control of the operating frequency of a CPU (hereinafter sometimes referred to as "CPU operating frequency control") in a multitasking OS for a desktop PC will be described.

First, the user or middleware specifies a CPU operating frequency policy (an algorithm for changing the operating frequency of a CPU, the upper limit and the lower limit of the operating frequency, and the durations of the algorithm, upper limit, and lower limit) and instructs the OS kernel to control the operating frequency. The OS kernel determines a target value for the operating frequency of the CPU, on the basis of CPU utilization and the operating frequency policy, and causes a control circuit driver in the CPU to carry out control of the operating frequency.

Related-art CPU operating frequency control, however, is carried out after the CPU utilization is observed, and therefore there is a long period of time between the occurrence of some load and a rise in the operating frequency of the CPU. For this reason, in cases where an instantaneously high throughput is desired, the feel the user experiences when performing operations sometimes deteriorates.

Furthermore, in the CPU operating frequency control module, if the rise in the operating frequency of the CPU is delayed, problems described below arise. For example, in the case of clearing the sleep mode of a portable information terminal, first, the OS kernel sets a timer for inhibiting sleep for a predetermined period of time, and subsequently the middleware and the application perform setting for inhibition of sleep before the timer expires. However, a large amount of processing occurs in clearance of the sleep mode. If control for raising the operating frequency of the CPU performed by the CPU operating frequency control module is delayed, the CPU does not completely perform a large amount of processing that has started, and thus a timer for inhibition of sleep of the OS kernel sometimes expires before the sleep mode is cleared. That is, although the power button is pressed down in order to return the portable information terminal from the sleep mode, the portable information terminal sometimes transitions to the sleep mode again before the sleep mode is cleared. Even when the portable information terminal does not transition to the sleep mode, it sometimes takes a significant amount of time from pressing down of the power button until the portable information terminal becomes practically operable. This sometimes impairs the usability of the device by the user.

In order to solve such a problem, a scheme called a boost exists. The boost is a scheme in which the lower limit of the operating frequency, which is a control parameter of the CPU operating frequency control module, is changed from the outside of the CPU operating frequency control module, so that the operating frequency of the CPU is instantaneously changed to a new operating frequency equal to or larger than the lower limit. When the boost is used, upon occurrence of an event for which an instantaneously high throughput is desired, the lower limit of the operating frequency of the CPU rises suddenly and temporarily, so that the event may be reliably processed.

Japanese Laid-open Patent Publication No. 2010-39791 discloses an example of the related art.

SUMMARY

According to an aspect of the invention, an information processing apparatus includes a memory, and a processor coupled to the memory and configured to set an operating frequency of the processor at a first value in response to an occurrence of a first event, when a second event occurs after the occurrence of the first event, to determine whether the second event occurs within a predetermined period after the occurrence of the first event, and when the second event occurs after the predetermined period, set the operating frequency at a second value, and when the second event occurs within the predetermined period, set the operating frequency at a third value higher than the second value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an outline of a terminal state parameter table according to the first embodiment;

FIGS. 6A and 6B illustrate an explanatory diagram of a specific example of the boost according to the first embodiment;

DESCRIPTION OF EMBODIMENTS

The related-art boost is used for situations where throughput of the CPU is most desired, such as a situation where the user switches the screen of a portable information terminal from the off-state to the on-state. For this reason, the lower limit of the operating frequency and the duration of the boost provided to the CPU operating frequency control module are determined so as to satisfy the greatest performance request. Therefore, when an event for which a high throughput is desired occurs, boost operation results in needless power consumption.

[First Embodiment]

Hereinafter, a first embodiment will be described with reference to FIG. 1 to FIG. 6.

In this embodiment, the control parameter of a boost is changed on the basis of the type of event that occurs in a portable information terminal 100, so that power consumption may be reduced without leading to insufficient performance of the CPU.

For example, for events such as switching from the off-screen to the on-screen and a push notification of an earthquake early warning, a delay in processing and an interruption of processing due to insufficient performance of the CPU are not permitted. Therefore, if such an event occurs, a boost (top-priority class boost) is carried out using a control parameter prepared in advance that enables all events to be reliably performed.

In contrast, if an event, such as e-mail checking, for which the CPU is allowed to have insufficient performance has occurred, a boost (standard class boost) is carried out using a control parameter associated with the terminal state of a portable information terminal in order to reduce power consumption.

However, when the terminal state is changed because of a specific event that has occurred in a portable information terminal, the determination of the terminal state made by the portable information terminal is sometimes delayed. For this reason, when another event for which the CPU is allowed to have insufficient performance has occurred immediately after the change in the terminal state, the boost (standard class boost) is sometimes unable to be carried out using a control parameter associated with the terminal state after the change. Accordingly, in a predetermined period of time after the change in the terminal state caused by the specific event, the boost (medium-priority class boost) is carried out using the control parameter determined in advance that enables a usual event to be reliably processed.

Figure 1:
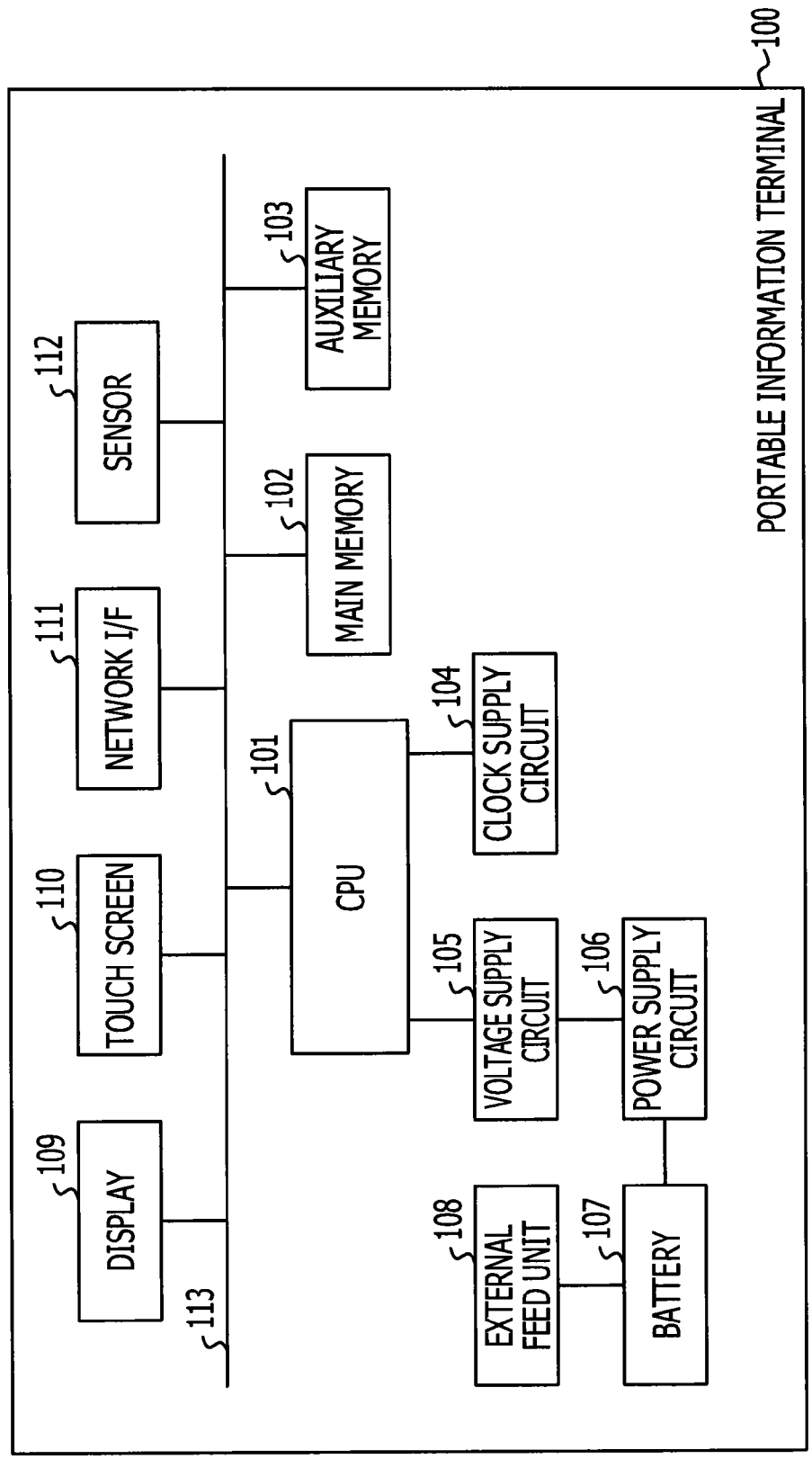
FIG. 1 is a schematic block diagram of a hardware configuration of a portable information terminal according to a first embodiment.

FIG. 1 is a schematic block diagram of the hardware configuration of the portable information terminal 100 according to the first embodiment. In this embodiment, the portable information terminal 100 is assumed to be, for example, a portable information processing device, such as a smartphone or a tablet PC.

As illustrated in FIG. 1, the portable information terminal 100 includes a CPU 101, a main memory 102, an auxiliary memory 103, a clock supply circuit 104, a voltage supply circuit 105, a power supply circuit 106, a battery 107, an external feed unit 108, a display 109, a touch screen 110, a network interface (I/F) 111, and a sensor 112 as hardware modules. These hardware modules are connected to one another by a bus 113.

The CPU 101 is assumed to be a processor that executes application programs, and is not a baseband large scale integrated (LSI) chip. The CPU 101 operates using clock signals supplied from the clock supply circuit 104 and a voltage supplied from the voltage supply circuit 105, and controls the various hardware modules of the portable information terminal 100. Additionally, the CPU 101 reads, into the main memory 102, various kinds of programs stored in the auxiliary memory 103 and executes the various kinds of programs read into the main memory 102, thereby implementing various kinds of functions. Details of various kinds of functions will be described later.

The main memory 102 stores the various kinds of programs executed by the CPU 101. Additionally, the main memory 102 is used as the work area of the CPU 101 and stores various kinds of data for processing performed by the CPU 101. As the main memory 102, a random access memory (RAM) or the like may be used, for example.

The auxiliary memory 103 stores various kinds of programs for operating the portable information terminal 100. Examples of the various kinds of programs include application programs executed by the portable information terminal 100, as well as an operating system (OS), which is an environment for execution of application programs, and so on. A control program according to this embodiment is also stored in the auxiliary memory 103. As the auxiliary memory 103, a nonvolatile memory, such as a hard disk or a flash memory, may be used, for example.

The clock supply circuit 104 generates clock signals for supply to the CPU 101. On the basis of power supplied from the power supply circuit 106, the voltage supply circuit 105 generates a variable voltage for supply to the CPU 101.

The power supply circuit 106 supplies power supplied from the battery 107 through power lines (not illustrated) to various hardware modules of the portable information terminal 100. However, if an external power supply (not illustrated) is connected to the external feed unit 108, the power supply circuit 106 may supply power supplied from the external feed unit 108 to the various hardware modules of the portable information terminal 100. The battery 107 supplies power to the power supply circuit 106. As the battery 107, a rechargeable battery, such as a lithium ion battery, may be used, for example.

The display 109 is controlled by the CPU 101 and displays image information. The touch screen 110 is attached to the display 109, and inputs position information with which the user's fingertip, a pen nib, or the like has been brought into contact.

The network I/F 111 is controlled by the CPU 101, and functions as an interface for receiving e-mails and twitter messages, for example.

The sensor 112 acquires the state information (terminal state) of the portable information terminal 100. The sensor 112 is assumed to be, for example, an acceleration sensor, a gyroscope sensor, an illuminance sensor, a geomagnetism sensor, an inclination sensor, a pressurization sensor, a proximity sensor, a temperature sensor, or the like.

Figure 2:
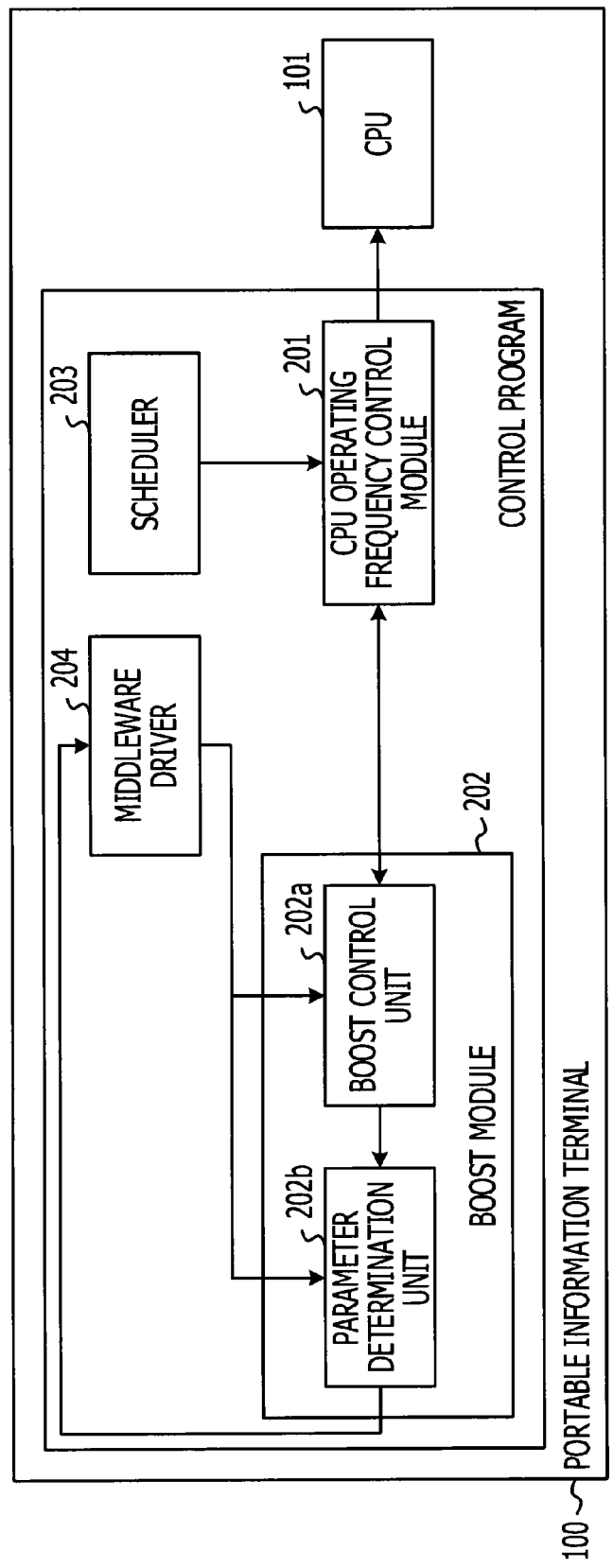
FIG. 2 is a schematic block diagram of functional blocks of the portable information terminal according to the first embodiment.

FIG. 2 is a schematic block diagram of functional blocks of the portable information terminal 100 according to the first embodiment.

As illustrated in FIG. 2, the portable information terminal 100 includes a CPU operating frequency control module 201, a boost module 202, a scheduler 203, and a middleware driver 204.

The CPU operating frequency control module 201, the boost module 202, the scheduler 203, and the middleware driver 204 are all implemented by the CPU 101 reading a control program into the main memory 102 and executing the control program read into the main memory 102.

The CPU operating frequency control module 201 controls the operating frequency of the CPU 101, on the basis of the load of the CPU 101 and a control parameter. The control parameter includes a control algorithm for changing the operating frequency of the CPU 101, the upper limit and the lower limit of the operating frequency, and the durations of the algorithm, upper limit, and lower limit, for example. For example, given that the lower limit of the operating frequency is 100 MHz and the duration is 2 seconds, the CPU operating frequency control module 201 will cause the CPU 101 to operate at an operating frequency of 100 MHz or more for 2 seconds after setting of the control parameter.

On the basis of a boost request from the middleware driver 204, the boost module 202 overwrites the control parameter of the CPU operating frequency control module 201. Additionally, on the basis of the terminal state of the portable information terminal 100, the boost module 202 overwrites the standard class parameter managed by the boost module 202. The boost module 202 manages the medium-priority class parameter and the top-priority class parameter, as well as the standard class parameter. The medium-priority class parameter and the top-priority class parameter all have fixed values determined in advance. Details of the boost module 202 will be described later.

The scheduler 203 acquires the load of the CPU 101 from the system state information of the OS kernel. As the load of the CPU 101, CPU utilization may be used, for example.

The middleware driver 204 functions as middleware or a device driver. For example, the occurrence of an event triggers the middleware driver 204 to provide a boost request to the boost module 202. The event is assumed to be, for example, switching from the off-screen to the on-screen (return from the sleep mode), a push notification of an earthquake early warning, an on-screen operation, server checking for e-mails (hereinafter referred to as "e-mail checking"), or the like. Note that, in this embodiment, switching from the off-screen to the on-screen and a push notification of an earthquake early warning are events for which the CPU is not allowed to have insufficient performance (the lack or reduction in the throughput), whereas an on-screen operation and e-mail checking are events for which the CPU is allowed to have insufficient performance. The boost request is an instruction for starting the boost that arises from the occurrence of an event. The boost request includes at least the content of an event.

Figure 3:
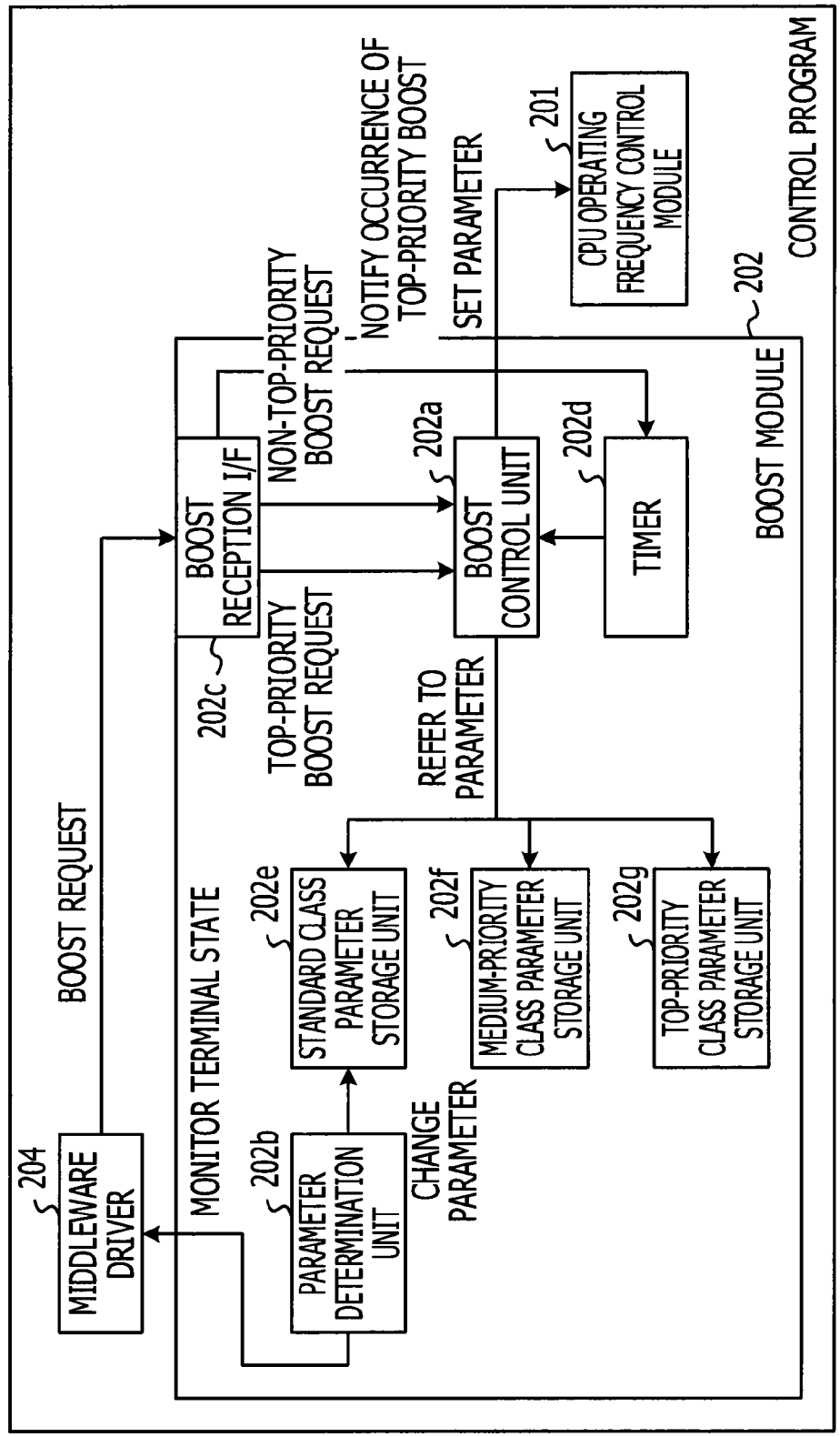
FIG. 3 is a schematic block diagram of detailed functional blocks of a boost module according to the first embodiment.

FIG. 3 is a schematic block diagram of detailed functional blocks of the boost module 202 according to the first embodiment.

As illustrated in FIG. 3, the boost module 202 includes a boost control unit 202a, a parameter determination unit 202b, a boost reception I/F 202c, a timer 202d, a standard class parameter storage unit 202e, a medium-priority class parameter storage unit 202f, and a top-priority class parameter storage unit 202g.

On the basis of a top-priority boost request or a non-top-priority boost request from the boost reception I/F 202, the boost control unit 202a acquires any of a standard class parameter, a medium-priority class parameter, and a top-priority class parameter from the standard class parameter storage unit 202e, the medium-priority class parameter storage unit 202f, and the top-priority class parameter storage unit 202g, and sets the acquired parameter as a control parameter of the CPU operating frequency control module 201.

In particular, if a top-priority boost request is provided from the boost reception I/F 202c, the boost control unit 202a acquires a top-priority class parameter from the top-priority class parameter storage unit 202g, and sets the acquired parameter as a control parameter of the CPU operating frequency control module 201. If a non-top-priority boost request is provided from the boost reception I/F 202c, the boost control unit 202a acquires a standard class parameter or a medium-priority class parameter from the standard class parameter storage unit 202e or the medium-priority class parameter storage unit 202f, on the basis of an elapsed time described later from the timer 202d, and sets the acquired parameter as a control parameter of the CPU operating frequency control module 201.

The parameter determination unit 202b updates the standard class parameter stored in the parameter storage 202e on the basis of terminal information from the middleware driver 204. Specifically, the parameter determination unit 202b acquires terminal information from the middleware driver 204 at regular intervals, and each time the terminal information changes, the parameter determination unit 202b reads a control parameter associated with the changed terminal information from a terminal state parameter table T and writes it as the control parameter of the standard class parameter storage unit 202e. Details of the terminal state parameter table T will be described later.

The boost reception I/F 202c accepts a boost request from the middleware driver 204. On the basis of the type of event corresponding to the boost request, the boost reception I/F 202c provides a top-priority boost request or a non-top-priority boost request to the boost control unit 202a. If a top-priority boost request is provided, the boost reception I/F 202c additionally notifies the timer 202d of the occurrence of a top-priority boost.

The timer 202d performs measurement of an elapsed time on the basis of the notification of the occurrence of the top-priority boost from the boost reception I/F 202c. That is, the timer 202d measures an elapsed time after the occurrence of an event in accordance with the top-priority boost request.

The standard class parameter storage unit 202e stores a standard class parameter. The standard class parameter is dynamically overwritten on the basis of the terminal information of the portable information terminal 100. The boost that uses a standard class parameter is assumed to be a standard class boost.

The medium-priority class parameter storage unit 202f stores a medium-priority class parameter. The medium-priority class parameter is a fixed parameter determined in advance. The boost that uses a medium-priority class parameter is assumed to be a medium-priority class boost.

The top-priority class parameter storage unit 202g stores a top-priority class parameter. The top-priority class parameter is a fixed parameter determined in advance. The boost that uses a top-priority class parameter is assumed to be a top-priority class boost. The medium-priority class parameter and the top-priority class parameter are set in such a manner that the throughput of the CPU 101 for the top-priority class boost is larger than the throughput of the CPU 101 for the medium-priority class parameter boost.

FIG. 4 is an outline of a terminal state parameter table T according to the first embodiment.

As illustrated in FIG. 4, the terminal state parameter table T stores a control parameter for every terminal state of the portable information terminal 100. In the terminal state parameter table T according to this embodiment, it is assumed that the terminal state is a combination of the on/off state of the screen and the type of active application, and the control parameter is the lower limit of the operating frequency of the CPU 101.

For example, a lower limit of 300 MHz of the operating frequency, which is a control parameter, is associated with the terminal state "1", which is "Screen: on, Active application: e-mail". A lower limit of 100 MHz of the operating frequency, which is a control parameter, is associated with the terminal state "2", which is "Screen: off, Active application: mail". However, the terminal state according to this embodiment is not limited to this, and may be implemented by combining the presence or absence of charging of the portable information terminal 100, and so on, as well as the on/off state of the screen and the type of active application. Additionally, the control parameter according to this embodiment may be implemented by combining the duration of the boost and the algorithm of the boost, and so on, as well as the lower limit of the operating frequency.

Figure 5:
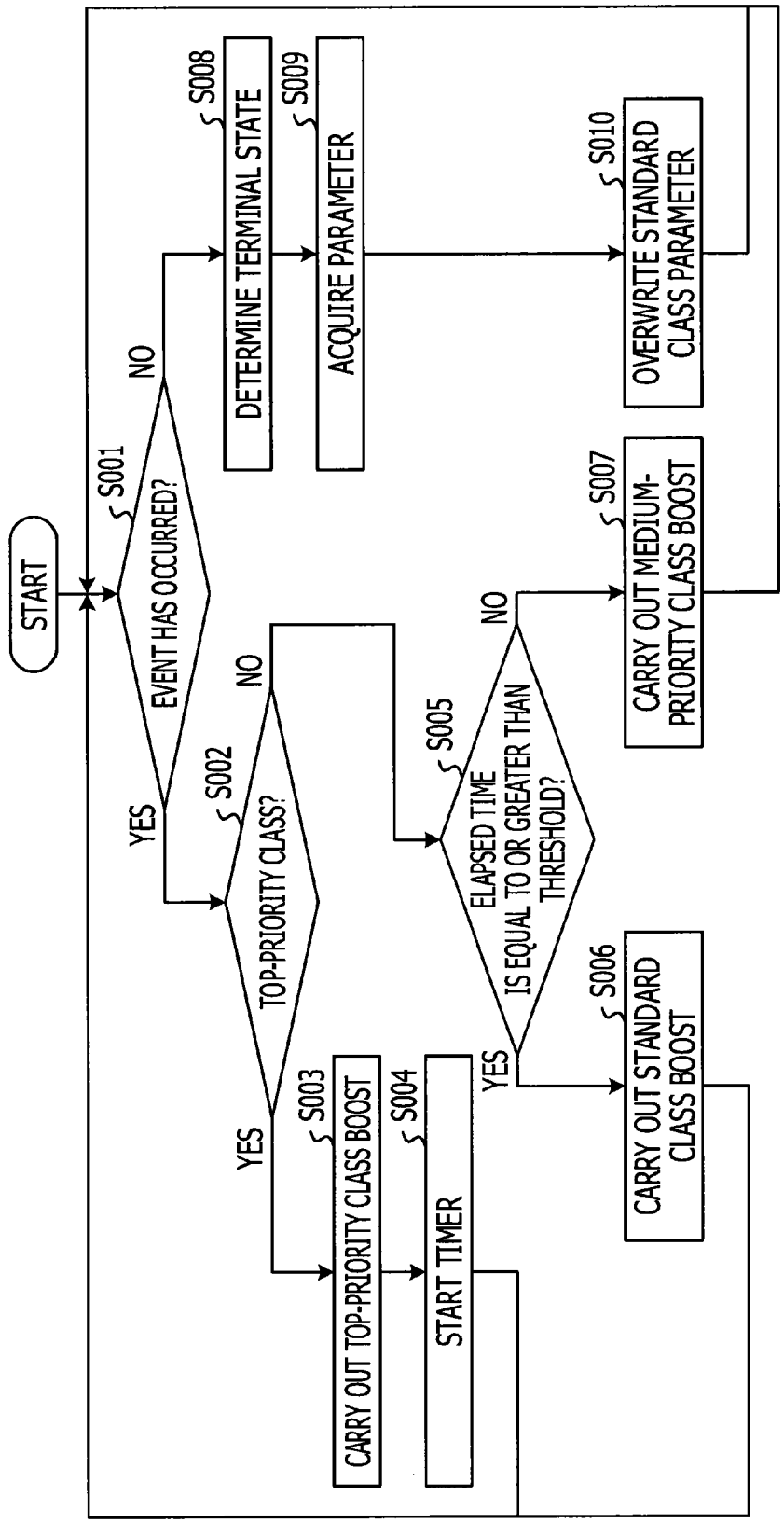
FIG. 5 is a flowchart of a boost according to the first embodiment.

FIG. 5 is a flowchart of a boost according to the first embodiment.

As illustrated in FIG. 5, on the basis of a boost request from the middleware driver 204, the boost reception I/F 202c determines whether an event to which a boost is to be applied has occurred (step S001).

Here, if it is determined that an event to which a boost is to be applied has occurred (Yes at step S001), then the boost reception I/F 202c determines whether the event is of the top-priority class (step S002). Note that events of the top-priority class are events for which the CPU 101 is not allowed to have insufficient performance, such as switching from the off-screen to the on-screen and a push notification of an earthquake early warning.

Here, if it is determined that the event is of the top-priority class (Yes at step S002), that is, if the CPU 101 is not allowed to have insufficient performance, the boost reception I/F 202c provides a top-priority boost request to the boost control unit 202a. On the basis of the top-priority boost request from the boost reception I/F 202c, the boost control unit 202a carries out a top-priority class boost (step S003). Specifically, the boost control unit 202a acquires a top-priority class parameter from the top-priority class parameter storage unit 202g, and writes it in the CPU operating frequency control module 201. In this way, the CPU operating frequency control module 201 controls the operating frequency of the CPU 101 using the top-priority class parameter. Thereby, the CPU 101 will demonstrate the throughput with which all events, such as switching from the off-screen to the on-screen and a push notification of an earthquake early warning, may be reliably processed.

Then, the boost reception I/F 202c notifies the timer 202d of the occurrence of the top-priority class boost so as to cause the timer 202d to start to measure an elapsed time from the top-priority class boost (step S004).

Then, on the basis of a boost request from the middleware driver 204, the boost reception I/F 202c determines again whether an event to which a boost is to be applied has occurred (step S001).

In contrast, if it is determined that the event is not of the top-priority class (No at step S002), that is, if the CPU 101 is allowed to have insufficient performance, the boost reception I/F 202c provides a non-top-priority boost request to the boost control unit 202a. On the basis of the non-top-priority boost request from the boost reception I/F 202c, the boost control unit 202a determines whether the elapsed time from the top-priority class boost is equal to or greater than a threshold (step S005).

Here, if it is determined that the elapsed time from the top-priority class boost is equal to or greater than the threshold (Yes at step S005), the boost control unit 202a determines that a standard class parameter associated with the terminal state after the top-priority class boost has been carried out is stored in the standard class parameter storage unit 202e, and carries out a standard class boost (step S006). Specifically, the boost control unit 202a reads a standard class parameter from the standard class parameter storage unit 202e and writes it in the CPU operating frequency control module 201. In this way, the CPU operating frequency control module 201 controls the operating frequency of the CPU 101 using the standard class parameter. Thereby, the CPU 101 will demonstrate the optimal throughput with which each event is able to be processed.

Then, on the basis of a boost request from the middleware driver 204, the boost reception I/F 202c determines again whether an event to which a boost is to be applied has occurred (step S001).

In contrast, if it is determined that the elapsed time from the top-priority class boost is not equal to or greater than the threshold (No at step S005), the boost control unit 202a determines that the standard class parameter associated with the terminal state after the top-priority class boost has been carried out is not stored in the standard class parameter storage unit 202e, and carries out a medium-priority class boost (step S007). Specifically, the boost control unit 202a reads a medium-priority class parameter from the medium-priority class parameter storage unit 202f and writes it in the CPU operating frequency control module 201. In this way, the CPU operating frequency control module 201 controls the operating frequency of the CPU 101 using the medium-priority class parameter. Thereby, the CPU 101 will demonstrate the throughput with which all usual events, that is, events that are not of the top-priority class, are able to be reliably processed.

Then, on the basis of a boost request from the middleware driver 204, the boost reception I/F 202c determines again whether an event to which a boost is to be applied has occurred (step S001).

In contrast, if it is determined that an event to which a boost is to be applied has not occurred (No at step S001), the parameter determination unit 202b specifies the terminal state of the portable information terminal 100 on the basis of various kinds of information from the middleware driver 204 (step S008). Specifically, on the basis of various kinds of information from the middleware driver 204, the parameter determination unit 202b acquires the on/off state of the screen and the type of active application and specifies the terminal state of the portable information terminal 100.

Then, referring to the terminal state parameter table T, the parameter determination unit 202b acquires a control parameter associated with the terminal state of the portable information terminal 100 (step S009). For example, if the terminal state is "Screen: on, Active application: e-mail", the parameter determination unit 202b will acquire a control parameter "Lower limit: 300 MHz" associated with the terminal state "1" from the terminal state parameter table T.

Then, the parameter determination unit 202b overwrites the standard class parameter stored in the standard class parameter storage unit 202e with the control parameter associated with the terminal state of the portable information terminal 100 (step S010). For example, if the terminal state is "1", the parameter determination unit 202b will update the standard class parameter to "Lower limit: 300 MHz".

FIG. 6A is an explanatory diagram of a specific example of a boost according to the first embodiment.

Part (a) in the drawing is a graph of the throughput and the processing load (actual workload) of the CPU 101 when boosts are carried out. In the graph, the horizontal axis represents the time (sec) and the vertical axis represents the throughput (MHz). The solid line denotes the throughput of the CPU 101, and the dotted line (broken line) denotes the processing load of the CPU 101. Part (b) in the drawing indicates the relationship among the terminal state of the portable information terminal 100, the determination status of the terminal state, and the parameter used for a boost.

When an event of e-mail checking occurs in a segment R1 in which the determination status of the terminal state is "Determined" and the terminal state is "Screen: off, Active application: e-mail", the boost module 202 carries out a standard class boost using a standard class parameter associated with the terminal state. That is, if the terminal state is "Screen: off, Active application: e-mail", it may be estimated that the portable information terminal 100 is intentionally not operated (contained in a pocket, and so on), and therefore the boost module 202 performs the event of e-mail checking while maintaining the throughput of the CPU 101 at a low level. Thereby, the power consumption for event processing is reduced.

On one hand, when an event of switching from the off-screen to the on-screen has occurred, the boost module 202 carries out a top-priority class boost using the top-priority class parameter, regardless of the terminal state of the portable information terminal 100. That is, the event of switching from the off-screen to the on-screen is an event for which the CPU 101 is not allowed to have insufficient performance, and therefore the boost module 202 gives priority to reliable processing of the event by significantly raising the throughput of the CPU 101 using the top-priority class parameter.

On the other hand, when an event of an on-screen operation or e-mail checking occurs in a segment R2 in which the elapsed time after the event of switching from the off-screen to the on-screen is less than a threshold, that is, in the segment R2 in which the elapsed time after the event for which the CPU 101 is not allowed to have insufficient performance is less than the threshold, the boost module 202 carries out a medium-priority class boost using the medium-priority class parameter, regardless of the type of the event. That is, after completion of the event for which the CPU 101 is not allowed to have insufficient performance, it is anticipated that an event of a relatively high load, such as an on-screen operation, will occur and the completion of a determination for the terminal state will be delayed, and therefore the boost module 202 uses the medium-priority class parameter, thereby giving priority to reliable processing of the event.

As described above, in this embodiment, if an event that has occurred in the portable information terminal 100 is of the top-priority class, that is, if the event is a specific event for which the CPU 101 is not allowed to have insufficient performance, the top-priority class boost is carried out using the control parameter (the top-priority class parameter) with which all events are able to be reliably processed. For this reason, failure in processing of the event resulting from insufficient performance of the CPU 101 may be avoided.

Additionally, if an event that has occurred in the portable information terminal 100 is not of the top-priority class, that is, if the CPU 101 is allowed to have insufficient performance, the standard class boost is carried out using a control parameter (standard class parameter) associated with the terminal state of the portable information terminal 100. For this reason, since the optimal boost for the terminal state of the portable information terminal 100 is carried out, needless power consumption may be reduced.

Furthermore, in a predetermined period of time after the change of the terminal state caused by a specific event that has occurred in the portable information terminal 100, the medium-priority class boost is carried out using the control parameter (the medium-priority class parameter) prepared in advance that enables a usual event to be reliably processed. For this reason, failure in processing of the event resulting from insufficient performance of the CPU 101 may also be avoided even after the change in the terminal state in the portable information terminal 100.

[Second Embodiment]

Hereinafter, a second embodiment will be described with reference to FIG. 7 to FIG. 9. However, the configurations, functions, and operations equivalent to those in the first embodiment will not be further described.

In this embodiment, it is assumed that, immediately before charging of a portable information terminal 100A, the portable information terminal 100A has transitioned to the energy saving mode (eco-mode) in association with a decrease in the battery residue of the battery 107. Note that the energy saving mode is a mode in which throughput of the CPU 101 is suppressed, so that the power consumption is reduced.

When charging of the portable information terminal 100A is started during the energy saving mode of the portable information terminal 100A, it becomes unnecessary to suppress the power consumption. However, the throughput of the CPU 101 is suppressed, and therefore it is anticipated that the completion of a determination of the terminal state will be delayed immediately after the charging. For this reason, until the control parameter of the standard class parameter storage unit 202e is updated after the change ("Under non-charging"→"Under charging") in the terminal state of the portable information terminal 100A, the throughput of the CPU 101 is suppressed although it is unnecessary to suppress power consumption. As a result, it sometimes takes a significant amount of time to perform event processing.

In order to solve the above problem, in this embodiment, if the elapsed time from the start of charging of the portable information terminal 100A is less than a threshold, for example, the boost module 202A carries out a medium-priority class boost using the medium-priority class parameter that is not dependent on the terminal state of the portable information terminal 100A. Thereby, in this embodiment, an event that has occurred immediately after charging of the portable information terminal 100A may also be reliably processed.

Figure 7:
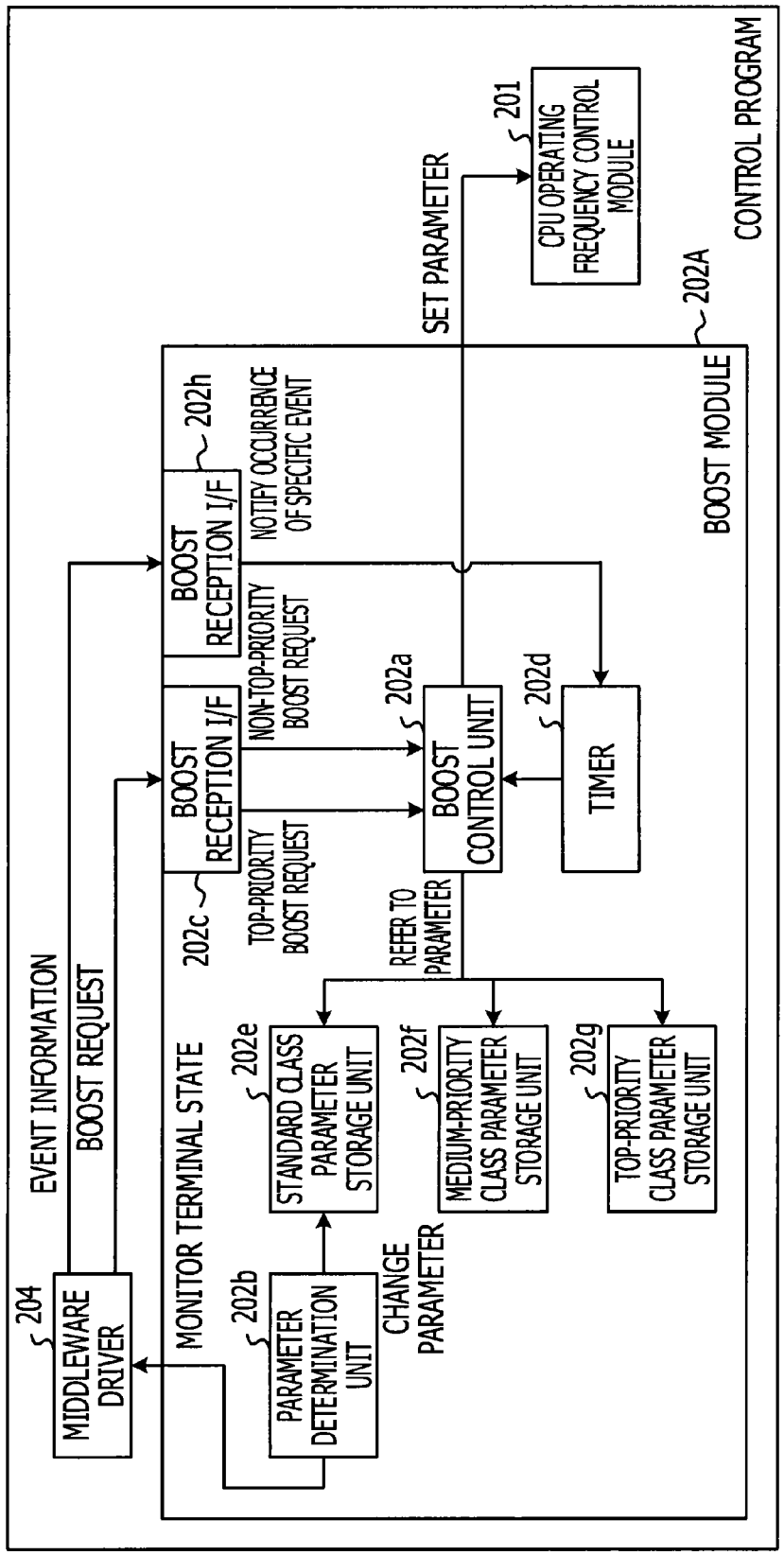
FIG. 7 is a schematic diagram of functional blocks of a portable information terminal according to a second embodiment.

FIG. 7 is a schematic diagram of functional blocks of the portable information terminal 100A according to the second embodiment.

As illustrated in FIG. 7, the portable information terminal 100A according to the second embodiment includes a boost module 202A instead of the boost module 202 according to the first embodiment.

The boost module 202A is implemented by the CPU 101 reading a control program into the main memory 102 and executing the control program read into the main memory 102.

The boost module 202A includes an event notification I/F 202h. The event notification I/F 202h accepts event information from the middleware driver 204. Additionally, when a specific event has occurred in the portable information terminal 100A, the event notification I/F 202h notifies the timer 202d of the occurrence of the specific event. The specific event is, for example, starting to charge the portable information terminal 100A.

Figure 8:
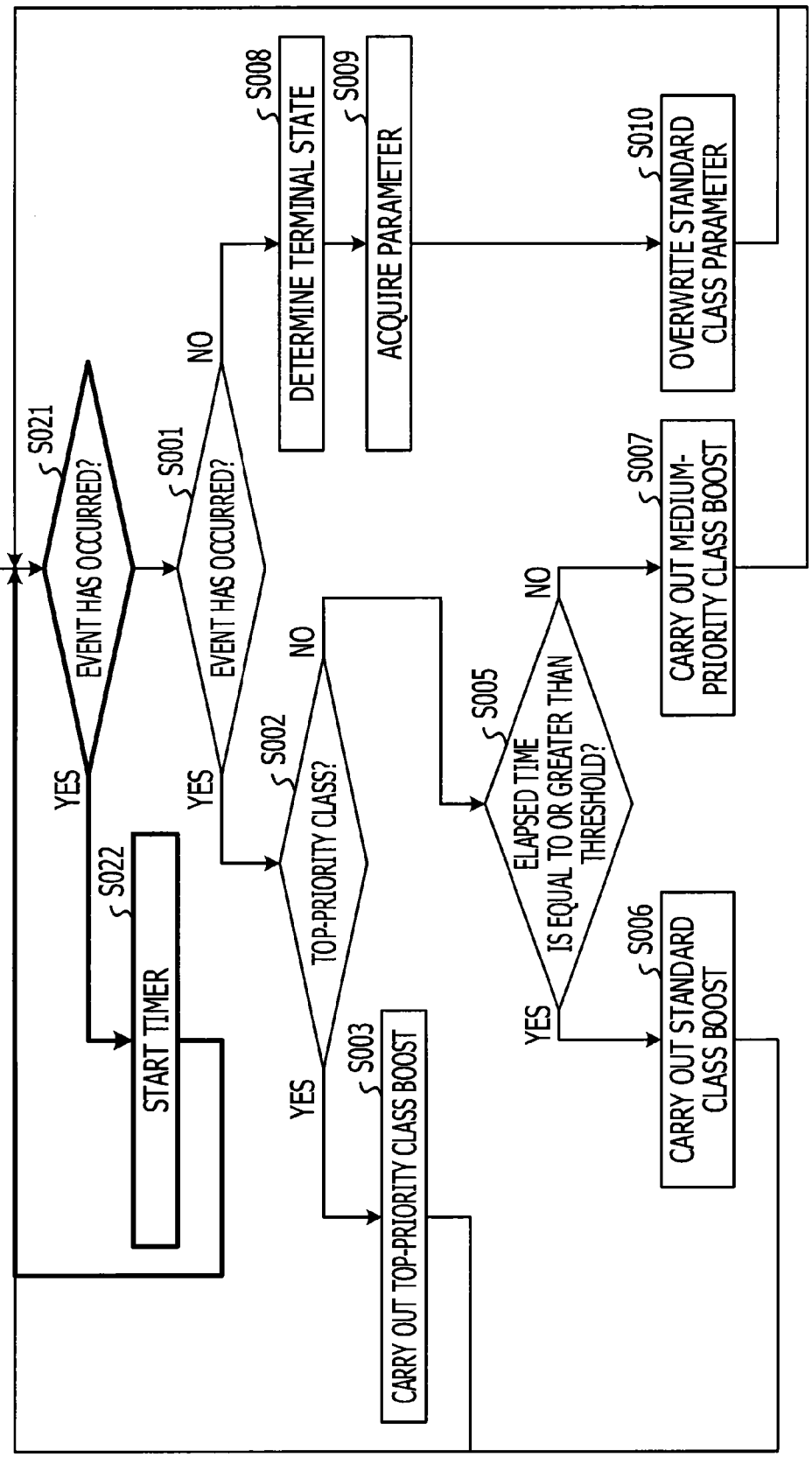
FIG. 8 is a flowchart of a boost according to the second embodiment.

FIG. 8 is a flowchart of a boost according to the second embodiment.

As illustrated in FIG. 8, on the basis of event information from the middleware driver 204, the event notification I/F 202h determines whether a specific event, for example, charging of the portable information terminal 100A has occurred (step S021).

Here, if it is determined that a specific event to which a boost is to be applied has occurred (Yes at step S021), the event reception I/F 202h notifies the timer 202d of the occurrence of the specific event so as to cause the timer 202d to start to measure an elapsed time from the specific event (step S022).

Then, on the basis of the event information from the middleware driver 204, the event reception I/F 202h determines again whether a specific event has occurred (step S021).

In contrast, if it is determined that a specific event has not occurred (No at step S021), then, just as in the first embodiment, on the basis of a boost request from the middleware driver 204, the boost reception I/F 202c determines whether an event to which a boost is to be applied has occurred (step S001). Subsequent processing is equivalent to that of the first embodiment.

Figure 9A:
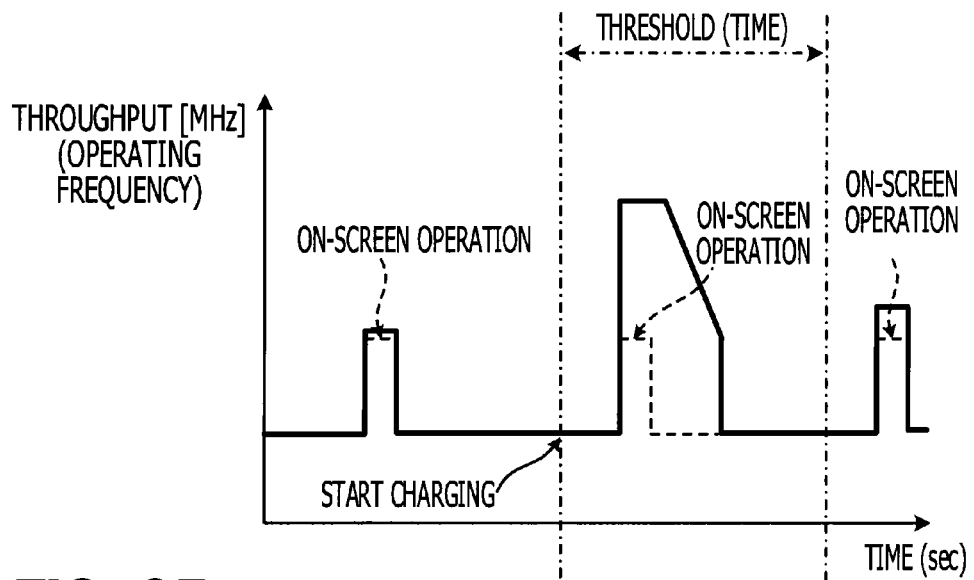
FIGS. 9A and 9B illustrate an explanatory diagram of a specific example of the boost according to the second embodiment.
Figure 9B:
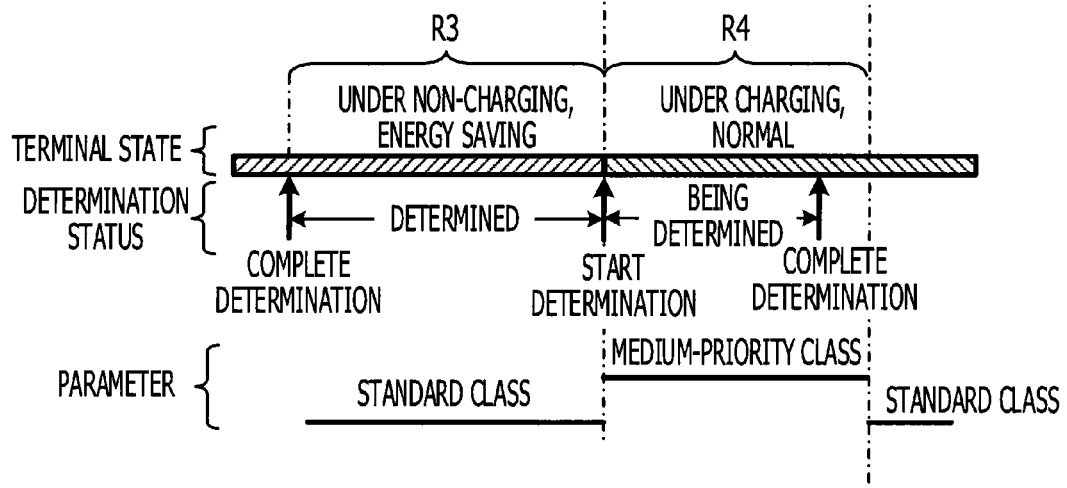

FIG. 9 is an explanatory diagram of a specific example of the boost according to the second embodiment.

Part (a) in the drawing is a graph of the throughput and the processing load (actual workload) of the CPU 101 when a boost is carried out. In the graph, the horizontal axis represents the time (sec) and the vertical axis represents the throughput (MHz). The solid line denotes the throughput of the CPU 101, and the dotted line (broken line) denotes the processing load of the CPU 101. Part (b) in the drawing indicates the relationship among the terminal state of the portable information terminal 100A, the determination status for the terminal state, and the parameter used for a boost.

When an event of an on-screen operation occurs in a segment R3 in which the determination status for the terminal state is "Determined" and the terminal state is "Charge: under non-charging, Mode: energy saving mode", the boost module 202A carries out a standard class boost using a standard class parameter associated with the terminal state. That is, when the terminal state is "Charge: under non-charging, Mode: energy saving mode", priority is to be given to reduction in power consumption, and therefore the boost module 202A processes the event of an on-screen operation while maintaining the throughput of the CPU 101 at a low level. Thereby, an increase in the power consumption for event processing is avoided.

In contrast, when an event of an on-screen operation occurs in a segment R4 in which the elapsed time after the event of starting to charge the portable information terminal 100A is less than the threshold, the boost module 202A carries out a medium-priority class boost using the medium-priority class parameter, regardless of the type of the event.

That is, it is anticipated that the determination of the terminal state of the portable information terminal 100A has not completed immediately after starting of charging, and therefore the boost module 202A uses the medium-priority class parameter, thereby giving priority to reliable processing of the event.

As described above, if the elapsed time after the start of a specific event, for example, a period of time elapsed after the start of charging of the portable information terminal 100A is less than the threshold, the boost module 202A according to this embodiment carries out a medium-priority class boost using the medium-priority class parameter prepared in advance. For this reason, failure in processing of the event resulting from insufficient performance of the CPU 101 may also be avoided in a segment in which the terminal information is not able to be obtained and that is immediately after the start of charging of the portable information terminal 100A, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
receive, at a first time, notification of a first event requesting a change of an operation frequency of the processor,
set the operation frequency of the processor at a first value in response to the first event,
receive, at a second time after the first time, notification of a second event requesting a change of the operation frequency of the processor,
measure a time difference between the first time and the second time,
determine whether the measured time difference is equal to or greater than a threshold time period, and
when the measured time difference is equal to or greater than the threshold time period, set the operation frequency at a second value, and when the measured time difference is less than the threshold time period, set the operation frequency at a third value higher than the second value.

2. The information processing apparatus according to claim 1, wherein
the second value is lower than the first value.

3. The information processing apparatus according to claim 1, wherein
the processor is configured to acknowledge a state of the information processing apparatus, and set the operation frequency associated with the acknowledged state.

4. The information processing apparatus according to claim 3, wherein
the state of the information processing apparatus is changed from a first state to a second state in response to the first event, the operation frequency in the second state is higher than operation frequency in the first state.

5. The information processing apparatus according to claim 4, wherein
the acknowledgement of the second state is performed within the threshold time period.

6. The information processing apparatus according to claim 4, wherein
the first state is off state of a screen of the information processing apparatus, and the second state is on state of the screen.

7. The information processing apparatus according to claim 4, wherein
the first state is non-charging state of a battery of the information processing apparatus, and the second state is charging state of the battery.

8. The information processing apparatus according to claim 1, wherein
the processor includes a CPU mounted in the information processing apparatus and configured to process in response to the second event.

9. A method of controlling an information processing apparatus, the method comprising:
receiving, at a first time, notification of a first event requesting a change of an operation frequency of the processor;
setting the operation frequency of a processor of the information processing apparatus at a first value in response to the a first event;
receiving, at a second time after the first time, notification of a second event requesting a change of the operation frequency of the processor;
measuring a time difference between the first time and the second time;
determining whether the measured time difference is equal to or greater than a threshold time period; and
when the measured time difference is equal to or greater than the threshold time period, setting the operation frequency at a second value, and when the measured time difference is less than the threshold time period, setting the operation frequency at a third value higher than the second value.

10. The method according to claim 9, wherein
the second value is lower than the first value.

11. The method according to claim 9, further comprising:
acknowledging a state of the information processing apparatus; and
setting the operation frequency associated with the acknowledged state.

12. The method according to claim 11, wherein
the state of the information processing apparatus is changed from a first state to a second state in response to the first event, the operation frequency in the second state is higher than operation frequency in the first state.

13. The method according to claim 12, wherein the acknowledgement of the second state is performed within the threshold time period.

14. The method according to claim 12, wherein
the first state is off state of a screen of the information processing apparatus, and the second state is on state of the screen.

15. The method according to claim 12, wherein
the first state is non-charging state of a battery of the information processing apparatus, and the second state is charging state of the battery.

16. The method according to claim 9, wherein
the processor includes a CPU mounted in the information processing apparatus and configured to process in response to the second event.

17. A non-transitory computer-readable storage medium storing a control program that causes an information processing apparatus to execute a process, the process comprising:
receiving, at a first time, notification of a first event requesting a change of an operation frequency of a processor;
setting the operation frequency of the processor of the information processing apparatus at a first value in response to the first event;
receiving, at a second time after the first time, notification of a second event requesting a change of the operation frequency of the processor;
measuring a time difference between the first time and the second time;
determining whether the measured time difference is equal to or greater than a threshold time period; and
when the measured time difference is equal to or greater than the threshold time period, setting the operation frequency at a second value, and when the measured time difference is less than the threshold time period, setting the operation frequency at a third value higher than the second value.

18. The non-transitory computer-readable storage medium according to claim 17, wherein
the second value is lower than the first value.

19. The non-transitory computer-readable storage medium according to claim 17, wherein the process further comprising:
acknowledging a state of the information processing apparatus; and
setting the operation frequency associated with the acknowledged state.

20. The non-transitory computer-readable storage medium according to claim 19, wherein
the state of the information processing apparatus is changed from a first state to a second state in response to the first event, the operation frequency in the second state is higher than operation frequency in the first state.

* * * * *